Aug. 13, 1963  H. BURKHARDT  3,100,345
DEVICES FOR ADJUSTING AND MEASURING LENGTHS AND ANGLES
Filed Nov. 12, 1958  7 Sheets-Sheet 1

INVENTOR
HORST BURKHARDT
BY
ATTORNEY

Aug. 13, 1963     H. BURKHARDT     3,100,345
DEVICES FOR ADJUSTING AND MEASURING LENGTHS AND ANGLES
Filed Nov. 12, 1958     7 Sheets-Sheet 2

INVENTOR
HORST BURKHARDT
BY 
ATTORNEY

Aug. 13, 1963 H. BURKHARDT 3,100,345
DEVICES FOR ADJUSTING AND MEASURING LENGTHS AND ANGLES
Filed Nov. 12, 1958 7 Sheets-Sheet 4

INVENTOR
HORST BURKHARDT
BY
ATTORNEY

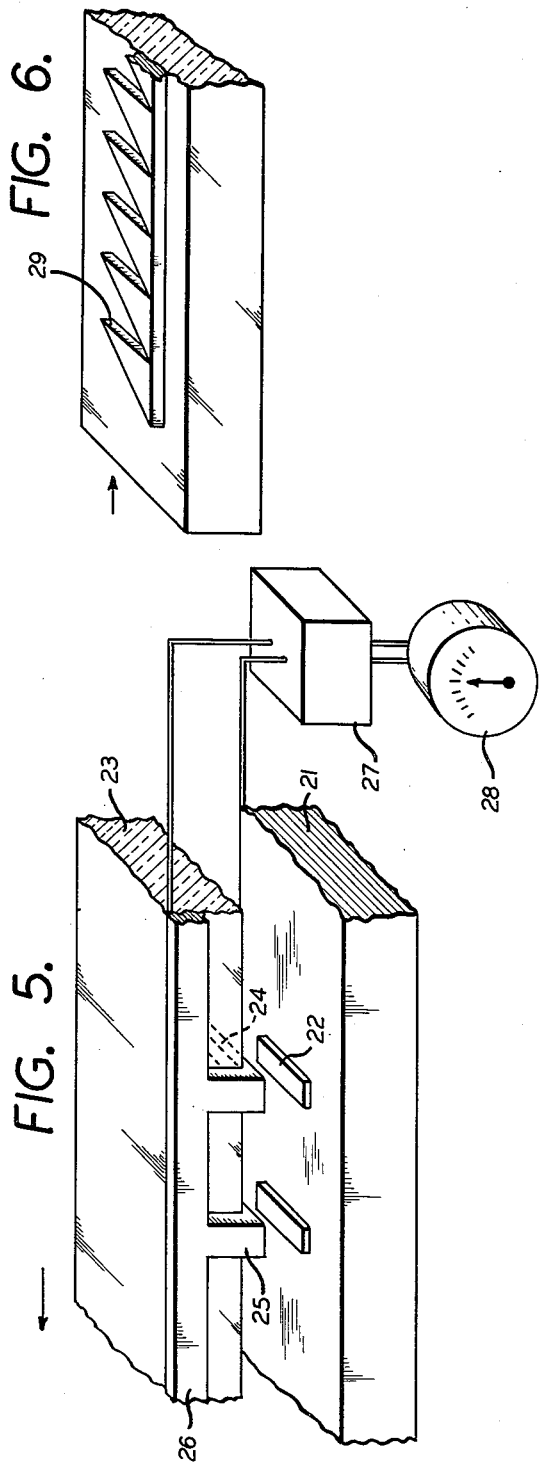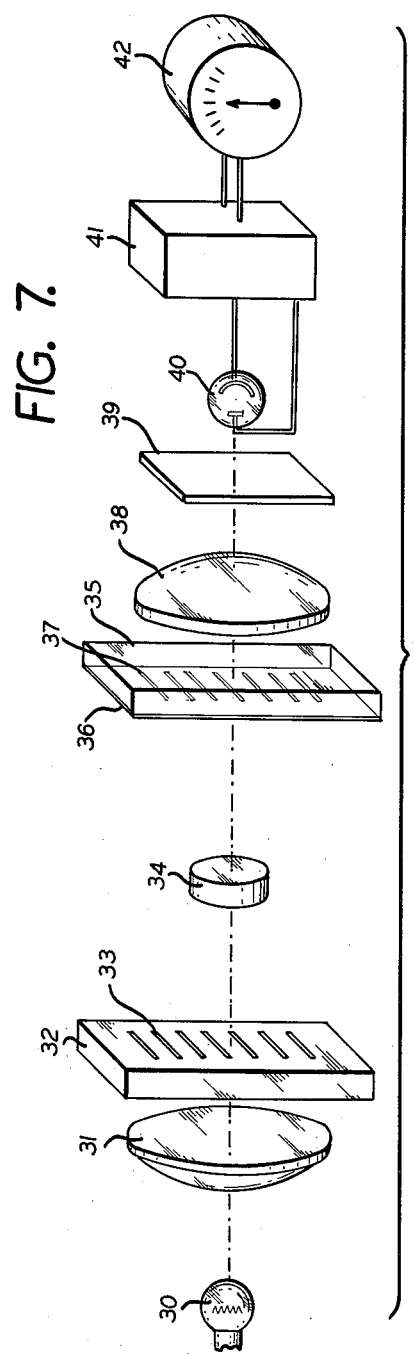

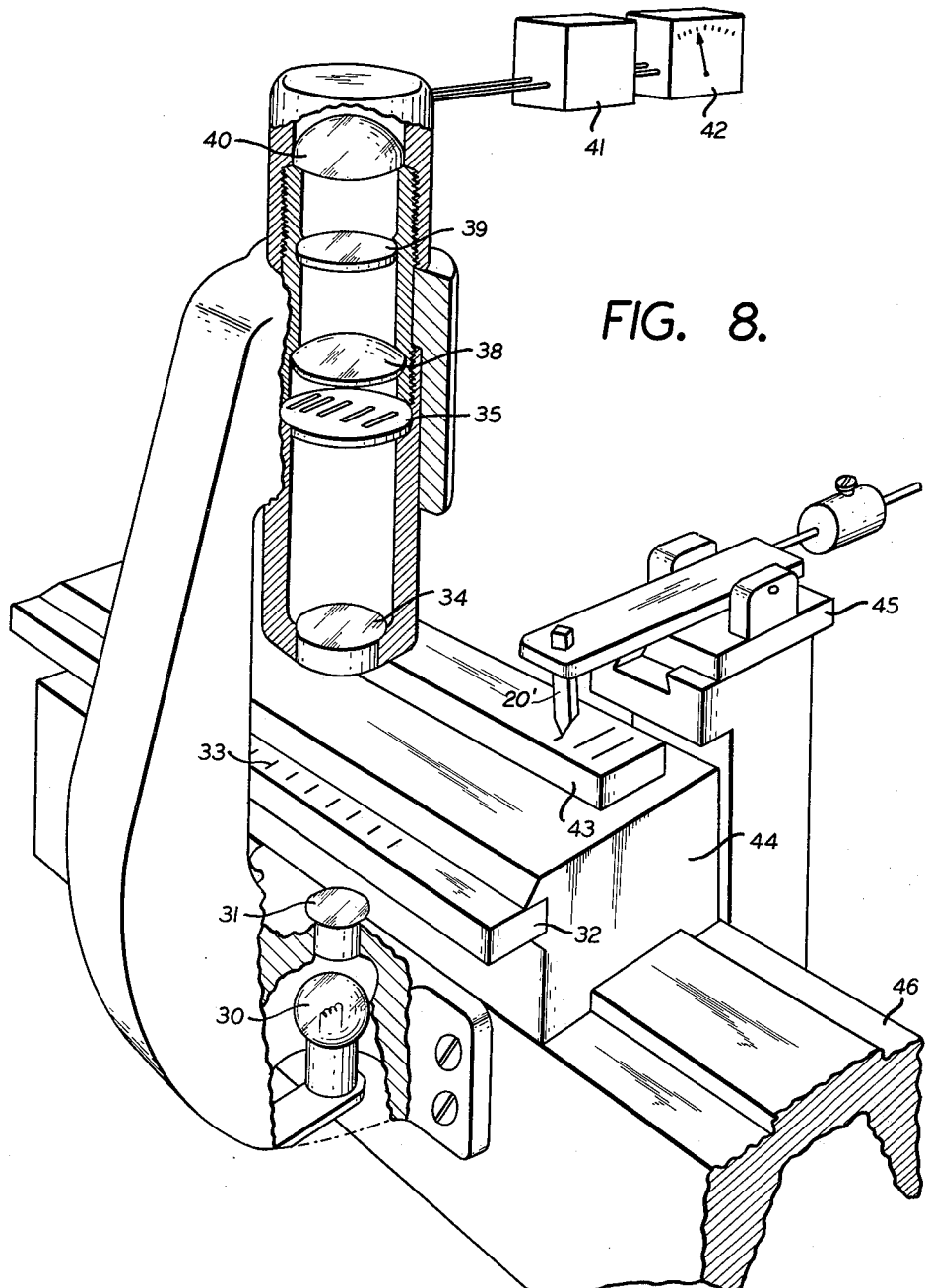

Aug. 13, 1963 H. BURKHARDT 3,100,345
DEVICES FOR ADJUSTING AND MEASURING LENGTHS AND ANGLES
Filed Nov. 12, 1958 7 Sheets-Sheet 7
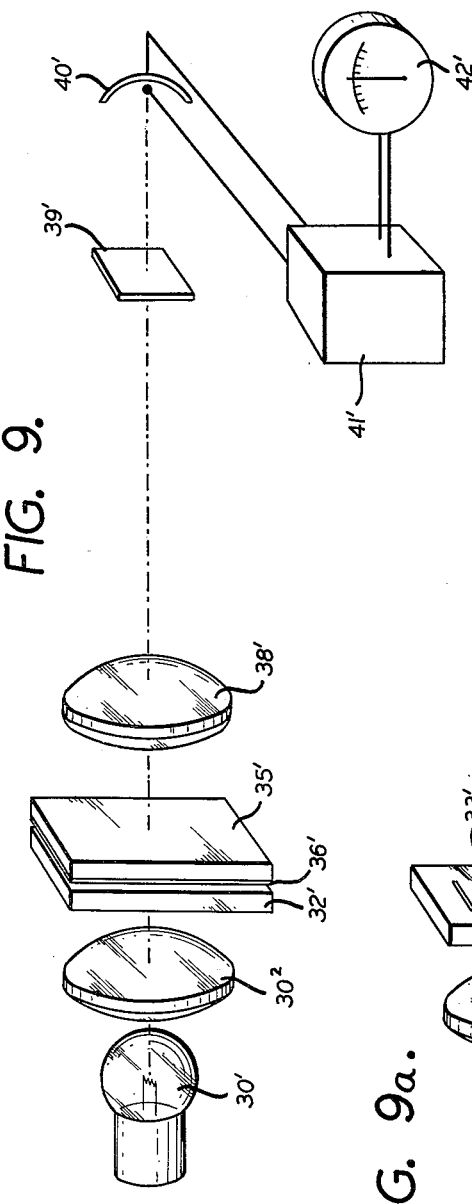
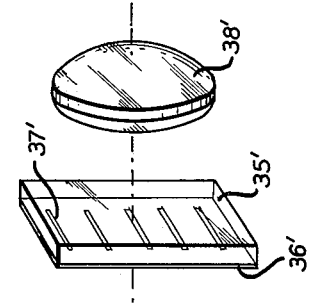
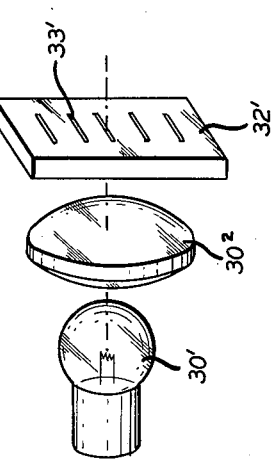
INVENTOR
HORST BURKHARDT
BY
ATTORNEY United States Patent Office 3,100,345
Patented Aug. 13, 1963

3,100,345
DEVICES FOR ADJUSTING AND MEASURING
LENGTHS AND ANGLES
Horst Burkhardt, Altenmarkt, near Traunstein, Upper
Bavaria, Germany, assignor to Fa. Wenczler & Heidenhain, Traunreut, near Traunstein, Upper Bavaria, Germany, a corporation of Germany
Filed Nov. 12, 1958, Ser. No. 773,365
18 Claims. (Cl. 33—1)

The present invention relates to devices for adjusting and measuring lengths and angles and for subdividing linear and circular distances into equal intervals of highest accuracy.

It is known to subdivide lengths and angles until now by means of spindles and endless screws, whereby vernier scales are employed in order to eliminate the effect of any residual error of the spindles and endless screws. The accuracy of subdivisions obtained in this manner is known, however, to be limited and highest accuracies are unobtainable, so that rules and protractors produced in this manner cause substantial errors.

It is one object of the present invention to provide a device for adjusting and measuring lengths and angles which permits of practically precise adjustments and measuring of lengths and angles and thus to produce practically fault-free divisions.

Thus the present device is concerned with the measuring of lengths, and the term "length" is to be construed as a measure taken linearly or angularly.

It is another object of the present invention to provide a device for adjusting and measuring lengths and angles which comprises a division machine, wherein the conventional spindles and endless screws are replaced by the inventive means.

It is also an object of the present invention to provide a device for adjusting and measuring lengths and angles wherein a plurality of subdivisions of two similarly subdivided rules, such as two linear or circular rules, are caused to cooperate with each other in such a way that every subdivision of the one rule and the equivalent subdivision of the other rule cooperate with each other; the only prerequisite being that the two rules incorporate exactly opposite calibration errors. For this purpose, the use of two rules is preferred that are mirror images of each other, since they can be readily prepared and satisfy the condition that for every subdivision of the one rule there is a subdivision of the other rule which causes the opposite calibration error of exactly the same magnitude.

Since, according to the arrangements of the present invention, the average is taken of a plurality of subdivision pairs incorporating equivalent but oppositely direct calibration errors, the latter cancel each other completely and the aforementioned result can be used to produce a third rule that is substantially a replica of these two guide rules, but without any calibration errors.

It is, therefore, still a further object of the present invention to provide means, including inaccurate rule pairs of the afore-described type, which permit the adjustment and measuring of lengths and angles and the production of rules of substantially theoretical accuracy.

With these and other objects in view which will become apparent in the following detailed description, the present invention will be clearly understood in connection with the accompanying drawings, in which:

FIG. 5 is a schematic fragmentary view of two cooperating guide rule elements;

FIG. 6 is a schematic fragmentary view of another type of guide rule elements;

FIG. 7 is a schematic illustration of a device for subdividing according to the present invention by photoelectric means;

FIG. 8 is a perspective side view of a device incorporating an application of the present invention using the arrangement of rays disclosed in FIG. 7;

FIG. 9 is a schematic showing of the arrangement of the rays using the photoelectric principle, wherein both division bodies form jointly a shutter and wherein division slides over division;

FIG. 9a is a perspective diagrammatic view of the lamp side of the arrangement and discloses the non-transparent graduation lines on the measuring body; and FIG. 9b is a perspective diagrammatic view of the photocell portion of the arrangement and shows the graduation lines in the non-transparent layer of the measuring body.

Figure 1:
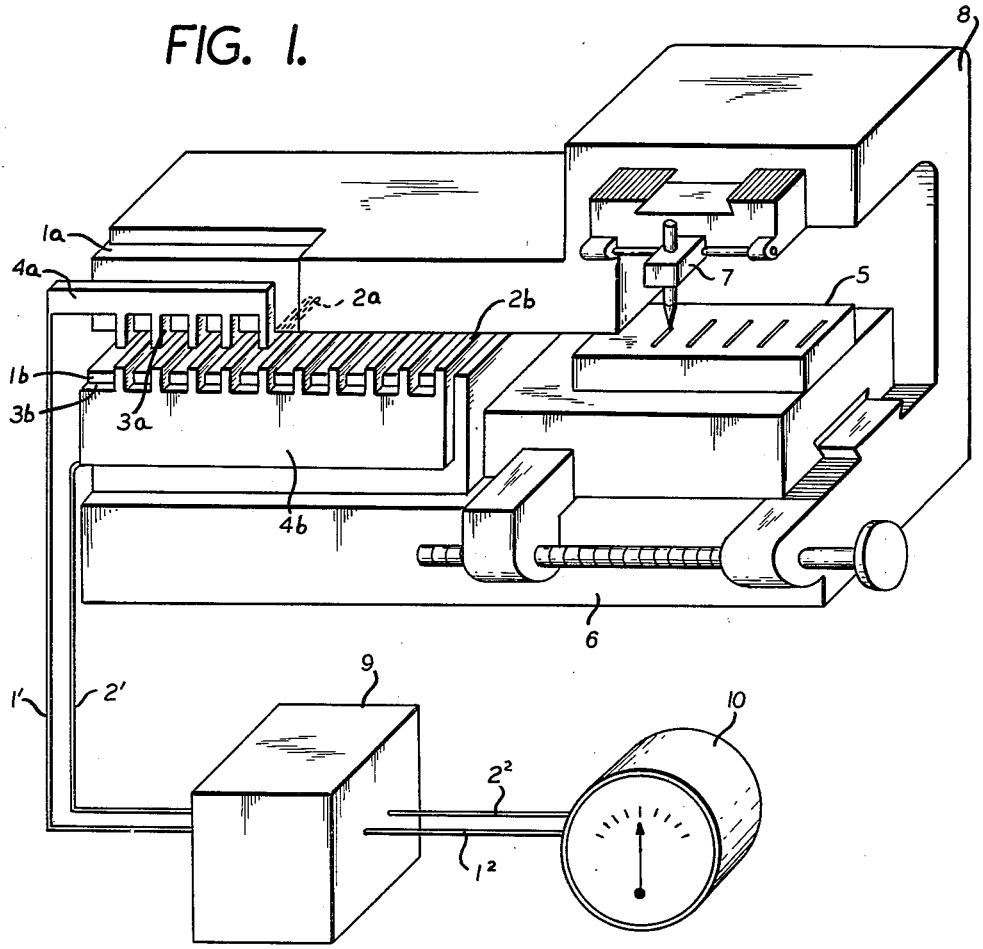
FIGURE 1 is a schematic illustration of a device for producing a linear rule.

Referring now to the drawings, and in particular to FIG. 1, the present device comprises an electrically non-conducting measuring body $1a$, which may be made, for instance, of glass, and a second electrically non-conducting measuring body $1b$ which also may be made, for instance, of glass. The measuring body $1a$ has mounted thereon electrically conducting narrow and thin prismatic rods $2a$ made, for instance, of metal which constitute the graduation lines and thus form a longitudinal division.

Electrically conducting narrow and thin prismatic rods $2b$ are mounted on the measuring body $1b$ which constitute graduation lines and also form a longitudinal division, the latter conforming with the division of the measuring body $1a$ as to the interval and to the shape of the graduation lines and which has a graduation line complementary to each graduation line of the measuring body $1a$ which incorporates a division error of the same magnitude, yet in opposite directions. Furthermore, electrically conducting rods $3a$, made, for instance, of metal, are provided which are connected with the rods $2a$. Electrically conducting rods $3b$, made, for instance, of metal, are also provided which are electrically connected with the rods $2b$. An electrically conducting rail $4a$ made, for instance, of metal, is secured to the measuring body $1a$ and electrically connected with the rods $3a$. Another electrically conducting rail $4b$ made, for instance, of metal, is also secured to the measuring body $1b$ and is electrically connected with the rods $3b$. Properly adjustably mounted on the device is a measuring body 5 to which a graduation division is to be applied. The bed 6 of a slide of a division machine is arranged in such manner that it carries the measuring body $1b$ and the measuring body 5 to which the graduation division is to be applied. An arm of the division machine carries the marker holder 7. The arm may consist of a frame 8 which carries the immovable measuring body $1a$ as well as the marking device. Electrical lines $1'$ and $2'$ are arranged from the measuring body $4a$ and $4b$, respectively, which leads to an amplifier 9 and additional electrical conductors $1^2$ and $2^2$ lead to a measuring instrument 10.

The electrically non-conducting measuring bodies $1a$ and $1b$, which are equipped with the electrically conducting rods $2a$ and $2b$ slide relative to each other together with the electrically conducting rods 2a and 2b at the closest possible distance forming jointly a condenser. If these two measuring bodies 1a and 1b which are disposed parallel and opposite each other, are moved relative to each other in the direction of graduation, changes in the capacity are caused.

The total capacity of a plurality of parallel disposed individual capacities is, however, equal to the sum of the individual capacities, as is well known. The individual capacity of two oppositely disposed scale lines in the embodiment shown in FIG. 1 of the present application, is now at first a square function of the distance between the scale lines in the direction of the scale, if the deviation of the exact opposite position of the two scale lines is not too great. Thus the arrangement is capable of determining the average value of the squares of the deviations.

Particularly, the capacity will reach its maximum in the position when the electrically conducting rods are exactly opposite each other. All division rods 2a and 2b of the two measuring bodies 1a and 1b are disposed simultaneously opposite each other, only when the division intervals and the arrangement of the division rods are completely without error in the divisions. If this does not correspond with the actual situation, the maximum of capacity occurs always when the average value of the squares of the deviations, measured in the direction of division, between the oppositely disposed pairs of division rods is at the minimum. The possible minimum positions, which coincide with the maximum values of the capacity, occur at distances of displacements which have the length of an interval of the two measuring bodies 1a and 2a forming the condenser. A graduation or division, resulting from the minimum positions of the average distance between pairs of the graduation rods has theoretically and practically no graduation errors due to the result of the average value over equal division errors occurring in the opposite pairs of division rods, which division errors have their origin in the errors of the two measuring bodies 1a and 1b.

The maxima of the capacity are obtained by means of an electronic measuring device for measuring small changes of the capacity, which device includes a measuring instrument 10. The measuring devices comprises, for instance, in principle, an oscillator having constant frequencies and amplitude and in series therewith a stage operating as a filter with an electrical oscillating circuit, the capacity of which is formed completely or partly by the capacity between the two scale bodies forming a condenser. Upon changing this capacity, the resonance frequency of the electrical oscillating circuit is changed and, thereby, the output voltage of the stage of the oscillating circuit. The output voltage of this stage is thus a measure for the capacity. The resonance frequency of the oscillating circuit may be adjusted, for instance, in such manner that, provided the distance between the scale lines disposed opposite each other in pairs, measured in the direction of the scale, is at a minimum taken as an average, the output voltage amounts to a maximum and is smaller in all other distance positions. The output alternating E.M.F. is rectified and may be amplified under certain circumstances by means of a direct current amplifier. The measuring device is a conventional rotary coil instrument and indicates the amplified direct current voltage. It is to be understood that any other known measuring device, capable of measuring small changes of the capacity, may be used to indicate these changes on a measuring device, instead of using the measuring or indicating device 10, as shown in the drawing.

If one of the scales is of double length compared with the length of the other scale, as shown in FIG. 1, the number of the effective scale lines remains constant, as long as the shorter measuring body is moved in the direction of the scale for no more than its division length towards the other end of the longer measuring body, starting from the relative position in which the two division ends are disposed opposite each other. The minimum adjustments, in the above stated manner, resolves in a scale the entire length of which is equal to the length of the shorter measuring body, if the number of the effective scale line pairs is constant.

Generally, in length divisions one of the two divisions of the combination must be at least as long, as jointly the other division of the combination and the division to be produced, if, in each of the opposite positions of the two division bodies toward each other, for each scale line of one division body a simultaneously effective scale line of the other division body should exist, because only then an equal number of scale lines of the two division bodies cooperate in each possible minimum adjustment position in the manner set forth above.

The longer scale must then have, in accordance with the present invention, a periodically repeating error distribution curve. Such periodic error distribution curve can be obtained by example in such manner, that a shorter scale of any error distribution is copied several times in succession on a carrier such that the start of the copy coincides with the end of the previous copy. As a shorter scale, which serves as original for the parts of the longer scale, the scale can be also used, which is determined to form jointly with the longer scale the minimum adjustments of the invention. There occurs then a plurality of positions, namely a plurality of full periods of the longer scale, of the one scale relative to the other, in which the scale lines of both scales are brought into coincidence. These positions are, however, not the only error-free positions, rather all positions are equidistant to each other, that means free of errors, in which a scale line of the longer scale is coordinated to each scale line of the shorter scale and simultaneously a minimum adjustment is present.

The combination, in accordance with the present invention, comprises thus in this case two scale bodies forming a condenser, the divisions of which are of unequal length, whereby the longer division is created from the shorter division in the described manner.

Figure 2:
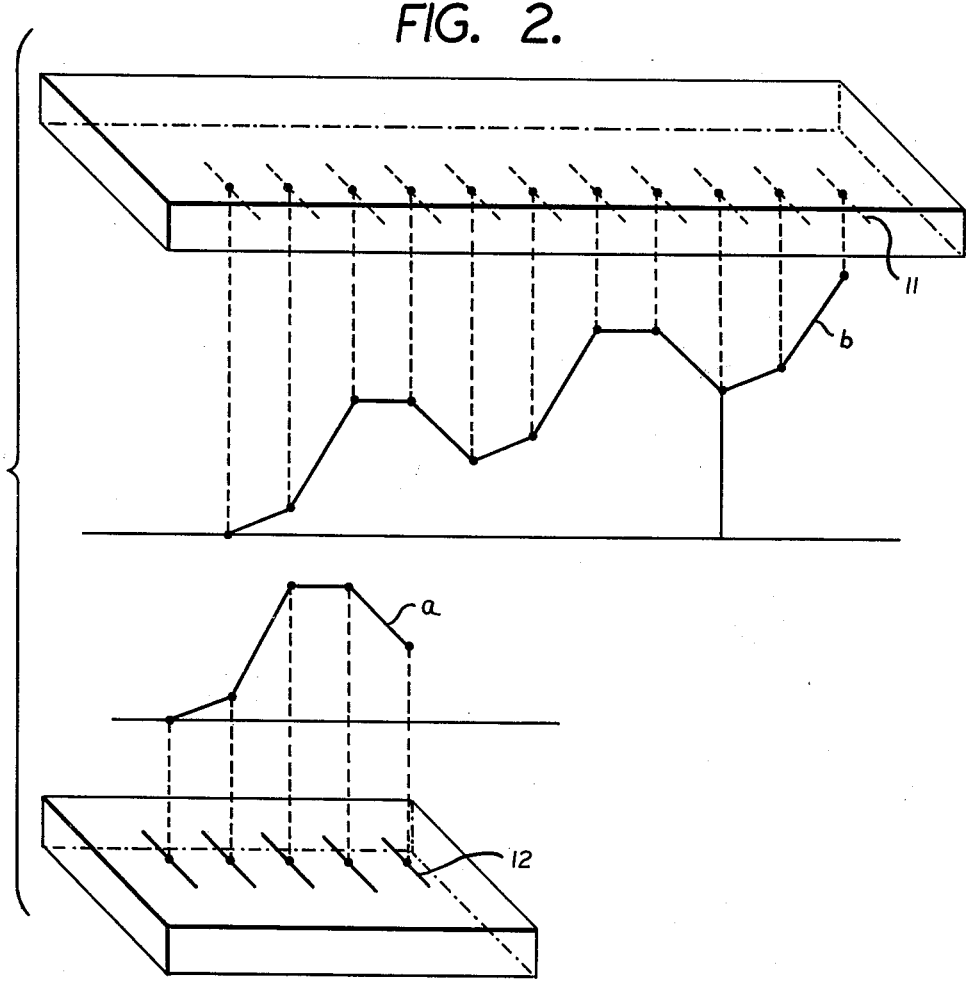
FIG. 2 shows two guide rules to be placed into cooperative alignment, and graphically depicts the error characteristics of the individual graduation marks.

FIG. 2 demonstrates the error occurrence $b$ of such longer scale 11, which in the above described manner is formed by joining 2½ times of the shorter scale 12 with the error occurrence $a$. In FIG. 2 the errors of the scale lines are indicated as ordinates above the point of the scale lines as abscissas.

Longer scales with the desired periodic error occurrence may be formed, for instance, in such manner that at first a base scale of the length of the desired shorter scale is copied on a scale carrier successively and in the same direction, as often as necessary in the above described manner so that the last scale line of the previous projection coincides with the first scale line of the next projection.

From the thus obtained longer original scale, which is made up of scale parts of equal length, the shorter as well as longer scale body may be obtained. Two different cases must be distinguished, however, namely:

*Case 1.*—The scale of the shorter scale body should be exactly congruent point for point, upon viewing from the same side of the scale carrier towards the scale parts of the longer scale body.

*Case 2.*—The scale of the shorter scale body should be exactly congruent point for point, upon viewing from the same side of the scale carrier, towards the mirror picture of the scale parts of the longer scale body.

In case 1, two equal copies are produced from the longer original scale, whereby the length of one copy is limited to the length of one of the scale parts of which the longer scale is made up.

In case 2, for instance, the longer scale which is equal to the original longer scale is formed of a plurality of shorter scales aligned next to each other formed as copies of a scale part of the longer original scale itself.

The desired positive and mirror picture copies are obtained by photographic or photomechanical means, if a process is used, shown, for instance, in connection with circular scales, described below.

The longer scale of the combination can be obtained with the desired error occurrence also by mechanical means as set forth above in such manner that always the same range of the scale machine is used for the production of the longer scale and by using only that range of the scale machine which has been used for the production of the shorter scale and by joining together the thus obtained scales in the above described manner on the scale carrier as often, until a longer scale of the required length is formed.

The shorter scale body and the longer scale body are then obtained from this mechanically produced longer original scale by using the above described means. It is a presumption for this photomechanical process, however, that the scale machines produce always scales with the same error occurrence in the chosen range, so that these scales are completely equal among each other.

Figure 3:
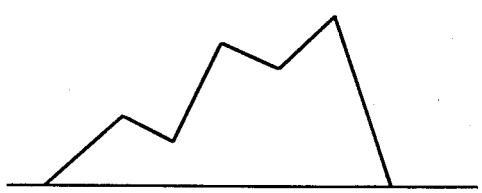
FIG. 3 is a graphic illustration of another sequence of graduation errors.
Figure 3A:
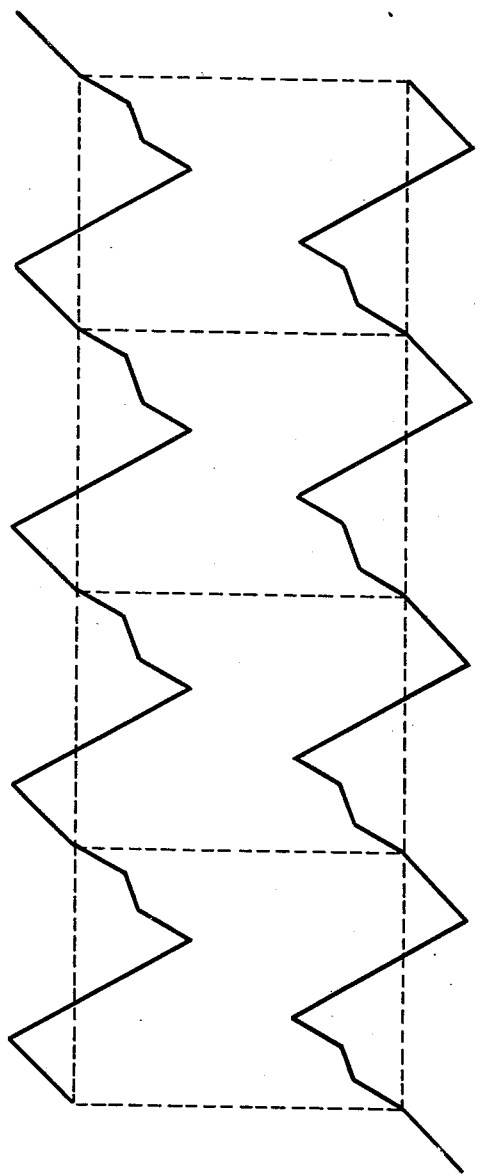
FIG. 3a is a diagrammatic showing of the error occurrence of the two division bodies relative to each other wherein the divisions are disposed parallel to each other and are pointing towards each other and the division directions of the two divisions are angularly spaced apart 180° and are disposed opposite to each other, respectively.

Yet, by using this principle, only an error free equal scale, that means an absolutely constant scale interval is achieved in longitudinal scales. An absolutely correct, that means an error-free length of the intervals and, thereby, of the total length can be achieved only, if the absolute length of the shorter scale is exact, thus the error curves of these scales, as shown in FIG. 3, reaches at its end again the error value zero. FIG. 3a shows the error ocurrence of the two scale bodies relative to each other, if they are disposed in accordance with the present invention in such manner, that their scales are arranged parallel to each other and directed towards each other and the scale directions of the two scales are displaced relative to each other for 180° or are disposed in opposite directions relative to each other.

Referring again to FIG. 1, the longer measuring body 1b is connected with the slide of a division machine, to which is secured a scale body 5 to receive the scale, which scale body 5 is disposed parallel to the scale of the measuring body 1b. At each of the minimum positions of the kind described above which are indicated by the capacity maxima, the slide will rest and the non-movable marker holder 7 will be operated. In this manner, a scale is created on the scale body 5 to be divided, in which the scale line position corresponds with the minima positions of the kind referred to above and given by the capacity maxima.

It is to be understood that the marker holder 7 can be also secured to the movable slide of the division machine and the scale body 5 to the non-movable stand thereof.

Figure 4:
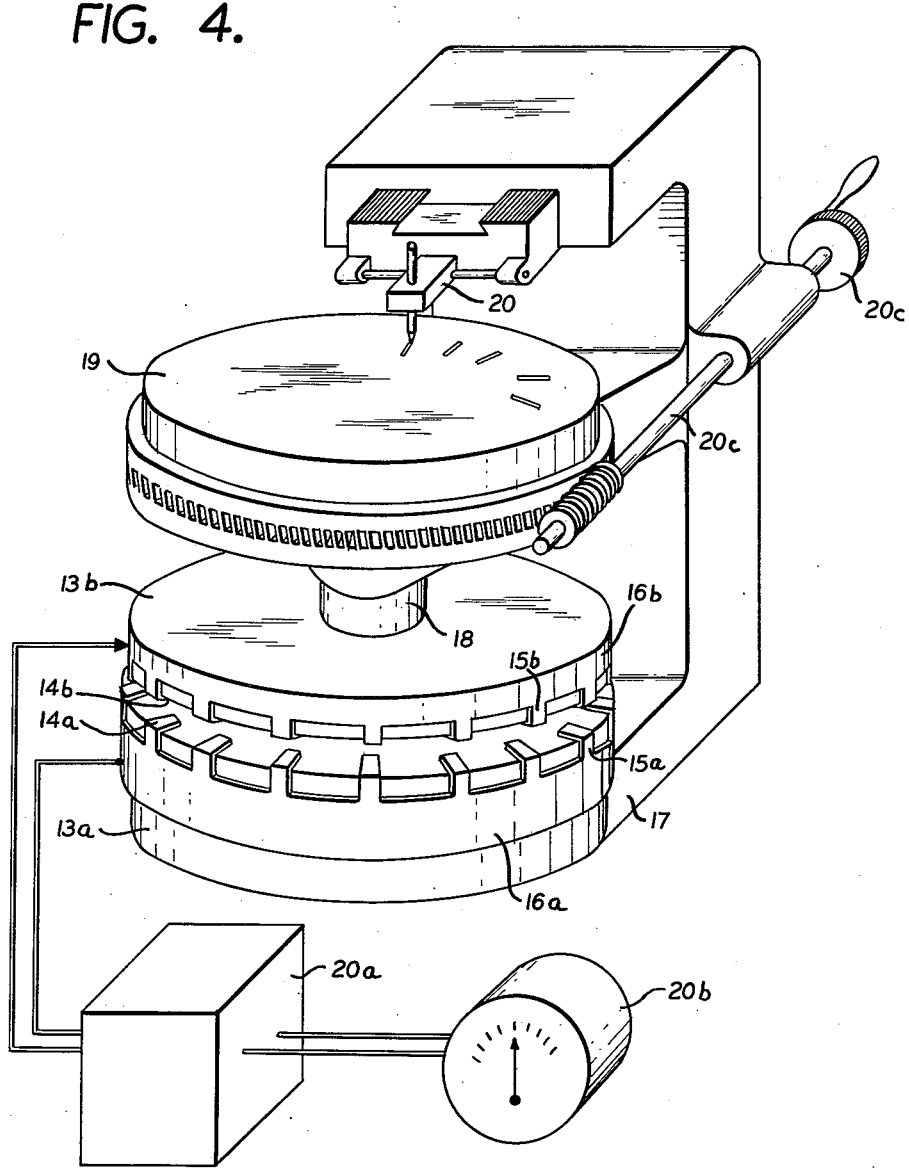
FIG. 4 is a schematic illustration of a device for a circular rule.

Referring now to FIG. 4, an arrangement designed in accordance with the present invention for circular scales, is disclosed. In particular, there is provided, as shown in FIG. 4, an electrically non-conducting circular scale body 13a of glass in the form of a circular disc, and a second electrically non-conducting circular scale body 13b of glass in the form of a circular disc. Electrically conducting scale lines 14a of metal in the form of narrow and thin prismatic rods are mounted on the circular scale body 13a, which rods constitute a circular scale. Electrically conducting scale lines 14b, for instance of metal in the form of narrow and thin prismatic rods, are also provided on the circular scale body 13b, which rods constitute a circular scale, which coincides with the division of the circular scale body 13a as to interval, division radius and scale line shape and which has a scale line which corresponds with each scale line 14a of the circular scale, which former scale line has the exact equal scale error in opposite direction as that of the latter scale line.

Electrically conducting ties 15a, for instance of metal, provide electrical connection with the scale lines 14a and electrically conducting ties 15b, for instance of metal, provide electrical connection with the scale lines 14b.

An electrically conducting rail 16a, for instance of metal, surrounds the cylindrical outer face of the circular scale body 13a and is in electrical connection with the ties 15a, and an electrically conducting rail 16b, for instance of metal, surrounds the cylindrical outer face of the circular scale body 13b and is electrically connected with the ties 15b.

A support 17 is provided for the non-rotating circular scale body 13a. A rotatable axle 18 is disposed coaxially to the scale of the circular scale body 13a on which axle 18 the circular scale body 13b is rotatably mounted in a position close to the circular scale body 13a, in such manner that the scales are disposed opposite each other and that the scale formed by the scale lines 14b of the circular scale body 13b is arranged coaxially to the scale formed by the scale lines 14a of the circular scale body 13a.

A disc 19 to which a circular scale is to be applied, is secured on top of the circular scale body 13b likewise coaxially to the circular scale body 13a on the axle 18. A marking tool 20 is provided above the disc 19, which tool 20 is rigidly secured to the support 17 carrying the circular scale body 13a. In the circuit fed to the respective circular scale bodies 13a and 13b is disposed an amplifier 20a and a measuring instrument 20b. FIG. 4 discloses also a drive 20c for the circular scale body 13b and for the disc 19 on which the circular scale is to be applied.

The two electrically non-conducting scale circular bodies 13a and 13b, which are equipped with the electrically conducting scale lines 14a and 14b, slide relative to each other at the narrowest possible distance with their scales disposed opposite each other and constitute together again a condenser. The possible minimum adjustments form a scale which coincides as to its angular value of the intervals with the scale lines of the two circular scale bodies 13a and 13b, which adjustments result, upon rotating the two circular scale bodies 13a and 13b relative to each other, and for which adjustment the distances between the oppositely disposed pairs of scale lines measured in the scale direction are at a minimum at average and which coincide with the maximum values of the capacity of the condenser formed by the circular scale bodies 13a and 13b. The thus shown circular scale has exactly the same advantages, as demonstrated in connection with the embodiment shown in FIG. 1 for longitudinal scales. In circular scales the number of the effective scale line pairs is constant relative to each other in the described embodiment, independently from the relative angular position of the two circular scale bodies 13a and 13b, so that particular measures in this direction are not required.

In order to bring about that a scale line of one circular scale exists for each scale line of the other circular scale, the scale error of which is equal exactly in opposite direction to that of the other scale line, it is required that two circular scale bodies are used, the scales of which viewed from the same side of the scale carrier are exactly congruent point for point relative to each other. If two such circular scale bodies are arranged with the scales directed towards each other coaxially in series or in superposed position the scale directions of the two scale bodies are disposed automatically in the desired manner oppositely to each other.

Such circular scale bodies with exactly equal scale errors, which, when viewed from the same side of the carrier, are exactly congruent point for point, may be produced, for instance, in such manner that two positive or two negative equal copies are made from an original circular scale in known manner by photographic or photomechanical means, if necessary, likewise in known manner in combination with layers which have been applied in a high vacuum in vapor form.

In the arrangement disclosed in FIG. 1, the two measuring bodies capable of being sensed capacitively and, in the arrangement of FIG. 4, the two circular scale bodies 13a and 13b are made of electrically non-conducting material, for instance glass, while the scale lines are made of conducting material, for instance metal, for instance metal.

FIG. 5 shows schematically a further embodiment designed in accordance with the present invention by providing a combination of two measuring rods capable of being sensed capacitively which jointly form a combination at an enlarged scale.

In particular, an electrically conducting scale body 21, for instance of metal, is provided, which carries electrically non-conducting scale lines 22 of a material having a high di-electric constant. Furthermore, an electrically non-conducting scale body 23, for instance of glass, is also provided which carries electrically conducting scale lines 24, for instance of metal. Electrically conducting ties 25, for instance of metal, which are electrically connected with the scale lines 24 are also provided, and an electrically conducting rail 26 provides electrical communication with the ties 25. Electrical conductors lead from the rail 26 and from the scale body 23 to an amplifier 27 and from there to a measuring instrument 28. In the embodiment disclosed in FIG. 5, the combination of both scale bodies jointly with their scale lines form likewise a condenser, upon sliding closely relative to each other the two scale bodies 21 and 23, disposed parallel to each other and, with their faces disposed opposite each other. Furthermore, the capacity of the condenser, formed by the two scale bodies 21 and 23, is also at its highest point in this case, when the scale lines of the two scales are as much as possible exactly opposite each other.

The change of capacity which results, when one scale of the combination slides along the other scale in the direction of the scale at a close distance from each other, depends in a decisive manner upon the shape of the scale marks. If the scale marks of the two scale bodies do not have the basic form of narrow and thin prismatic rods, rather are made in another suitable form, for instance in form of thin triangular bodies, it is easily achieved that the capacity receives a value which is clearly and precisely dependent upon the distance, measured in the direction of the scale, between the geometrical center points of the scale marks disposed in pairs oppositely each other and which is sufficiently great in all relative positions of the two scale bodies of the combination. This is, for instance, the case if, as shown in FIG. 6, the scale mark bodies 29 of the two scale bodies of the combination have triangular circumferences, which engage each other.

The electrically conducting scale lines or scale marks, the electrically conducting ties, the electrically conducting rails, as well as the electrically non-conducting scale lines or scale marks can be produced by applying metals and material, respectively, having a high di-electric constant in vapor in a high vacuum in connection with photo-chemical processes.

In order to produce the scale lines and the scale marks, respectively, the following steps are taken:

The original scale is used which comprises non-transparent scale lines on a transparent base and this scale is copied by a photo-mechanical process by proper exposure onto a plane surface of the body operating as carrier, which plane surface is covered with a layer of a light sensitive bichromate varnish. The non-exposed portions of the varnish are then removed by the following development. The scale carrier has now a varnish relief, in which the scale lines are recessed up to the surface of the glass, so that the ranges corresponding to the scale lines are free from the varnish cover. If, now, the thus treated surface of the scale carrier is subjected to a vapor of metal, for instance aluminum, in high vacuum, this metal sits only on the portions corresponding to the scale lines directly on the surface of the scale carrier, while a varnish layer is present on the other portions between the metal layer applied in vapor form and the surface of the scale carrier. If, now, the thus treated scale carrier is subjected to treatment with a solution by which the exposed varnish is dissolved, the varnish, together with the metal layer disposed thereon, is removed from the scale carrier and only the metal layer defining the scale lines and disposed directly on the surface of the scale carrier remains.

Copies produced in this manner are congruent relative to each other in the described manner. In order to provide scales which are mirror pictures relative to each other, it is only necessary to provide copies from one of the copies of the original scale and to combine these copies with the copies obtained directly from the original scale.

In order to produce copies and scale bodies, respectively, with non-conducting scale lines or scale marks, it is only necessary to apply materials of a high di-electric constant, for instance titanium dioxide, silicon monoxide, ceric oxide or thorium-oxide in vapor form.

The combination, in accordance with the present invention, of two scale bodies, can be used also in connection with a photo-electric device for adjustment and measuring of lengths and angles, whereby the two scale bodies form jointly a diaphragm, the light penetration of which depends upon the relative positions of the two scale bodies relative to each other.

In FIG. 7 the path of the rays of a photo-electrical device designed in accordance with the present invention is shown schematically which is used for the adjustment and measuring of lengths, which contains as an essential element the combination of two scale bodies, in accordance with the present invention, the scales of said bodies being projected upon each other optically.

In particular, a lamp with a coil filament 30 is provided which throws light onto a condenser 31 and which goes then further through a transparent measuring body 32, the non-transparent scale lines 33 of which are provided on the measuring body 32. Upon passing the measuring body 32 the light rays go through an objective 34 and reach then a transparent measuring body 35 which carries on one side thereof a thin and non-transparent layer 36. The transparent scale lines 37 of the measuring body 35 are recessed from the non-transparent layer 36 and are geometrically equal with the scale lines 33, which scale lines 37 are exactly congruent or are a congruent mirror picture, point for point, of the scale lines 33. The light rays upon passing through the transparent portions of the measuring body 35 to a field lens 38 reach a ground glass disc 39 and then a photocell 40 from which an electrical conduit leads to an amplifier 41 and from there to an electrical indicating device 42.

In the light ray path, the filament 30 is projected through the condenser 31 and an aperture of the objective 34 and through the field lens 38, the aperture of the objective 34 being projected jointly with the filament picture onto the photocell 40.

The ground glass disc 39 serves the purpose of distributing equally the light onto the light sensitive face of the photocell 40.

The scale lines 33 are projected by means of the light rays through the objective 34 to form the scale lines 37 at a scale of 1:1. In the arrangement of the second measuring body 35, which is in series with the first measuring body 32, it is to be observed that the scale lines 37 run in opposite direction to the image produced thereon of the scale lines 33.

If one of the two measuring bodies 32 or 35 is moved in direction of the scale relative to the other measuring body, a minimum of the light rays originating from the filament 30 through the optical elements of the entire device and through the two measuring bodies 32 and 35 is thrown onto the photocell 40, if the image of the scale lines 33 coincides pretty well with the scale lines 37.

FIG. 8 shows a schematic arrangement of a device for adjustment of a scale machine in accordance with the present invention applying a photo-electric process, which essential element contains the ray path disclosed in FIG. 7 and in which two scale bodies operate as shutters.

The elements bearing the numerals 30 to 42 in FIG. 8 depict the same elements shown in FIG. 7. In addition, a measuring body 43 is provided to which a scale is to be applied. As may be readily determined from FIG. 8, there is also provided a bed 44 of the slide of a scale machine, which bed 44 carries a measuring body 32 and the measuring body 43 to which a scale is to be applied. Furthermore, a marking tool 20' is arranged in the scale machine and also a support 46 is provided which carries the immovable measuring body 35 and the marking tool slide 45.

The electrical values, for instance the voltage produced by the photocell, is fed to a measuring instrument 42 by means of an amplifier 41, the electrical values being controlled from the photocell due to the light stream falling upon the cell. The measuring device 42 indicates in this manner the size of the light stream falling upon the photocell 40. The photocell 40 may comprise, for instance, a photo-multiplier in a known circuit with corresponding voltage amplifier. In this case, the amplifier 41 may be eliminated and the light intensity can be measured directly by a direct current measuring device which is properly dimensioned and disposed in an anode circuit.

In case a high vacuum cell is used instead of a photo-multiplier, it is generally required to provide a direct current amplifier 41 due to the low sensitivity of indicator measuring devices, which direct current amplifier 41 amplifies the voltage changes occurring in a high working resistance of the photocell in case of light changes and which permits the measuring by means of the indicator device 42. The indicator device is a direct current measuring device of the rotary coil type.

If the distance between the oppositely disposed scale lines arranged in pairs and measured in the direction of the scale is at a minimum, the light stream falling onto the photocell is reduced likewise to a minimum. These relative adjustments of the two scales into possibly exact covering, wherein the light stream falling onto the photocell is at a minimum, occur in adjustment distances which have the length of an interval between the two scale bodies, each of which forms a diaphragm. A scale based on these minimum adjustments of the average distance of the pairs of scale lines has theoretically and practically no scale errors due to the effective average value formation arrived at from the exactly oppositely disposed scale errors of the pairs of scale lines, which scale errors have their origin in the errors of the two scale bodies. During the scale production the slide which carries the measuring body 32 and the measuring body 43 on which the scale is to be applied is adjusted successively in such a manner that the light stream flowing towards a photocell is at its minimum and the marking device 45 is operated at each of such positions.

It is also possible to make the scale lines of both scale bodies transparent on a non-transparent base. In this case, the light stream falling on to the photocell reaches a maximum, when the scale lines of both scales cover each other pretty well. As to the shape of the scale lines, the same conditions and possibilities apply as in the combinations forming one condenser.

In the photo-electrical embodiment of the combination of the present invention, it is also possible to use scale marks of particular shape for both scale bodies instead of the conventional scale lines. It is thus possible, for instance, to use also triangular scale marks which engage each other, as shown in FIG. 6 of the drawings.

It is possible to achieve in all positions of the two measuring bodies relative to each other a sufficiently large light stream, the size of which receives a value which is clearly and undoubtedly dependent upon the distance measured in the scale direction between the geometrical center points of the scale marks projected in pairs on each other. It can be readily seen that the photo-electric checking principle may be applied also to combinations of two circular scales.

The relative arrangement of the two scale bodies can be made in the photo-electric checking principle also in such a manner that the two scale bodies having scales disposed opposite each other, are arranged in possibly small distance either in superposed or series position.

The light ray path of such arrangement, which contains as an essential element the combination of two scale bodies in accordance with the present invention, wherein the scale bodies slide over each other from scale line to scale line, is shown schematically in FIG. 9.

Referring now to FIGS. 9, 9a and 9b, a lamp filament 30' is provided which throws light rays to a lens $30^2$ to reach a transparent measuring body 32' which carries the non-transparent scale lines and is disposed opposite a transparent measuring body 35' which has on one of its sides a thin and non-transparent layer 36'. The transparent scale lines 37' which are recessed out of the non-transparent layer 36' are geometrically equal to the scale lines 33' provided on the measuring body 32', upon viewing from the same side of the scale carrier, and which are, point for point, exactly congruent, carry a mirror picture congruent scale. A field lens 38' follows the transparent scale body 35' to be followed by a ground glass disc 39' which leads the light rays to a photocell 40' and over an amplifier 41' to an electrically indicating instrument 42'.

FIG. 9 shows schematically the entire arrangement in which the scale lines on the measuring body 32' and the scale lines provided in the transparent layer 36' of the measuring body 35' are not shown.

FIG. 9a shows merely the lamp side of the arrangement and demonstrates the non-transparent scale lines 33' on the transparent measuring body 32'.

FIG. 9b shows the photocell side of the arrangement and demonstrates the transparent scale lines 37' which are recessed in the non-transparent layer 36' of the measuring body 35'. The filament is disposed in the forward focus point of the lens $30^2$, so that the light is fed through the two scale bodies 32' and 35' in form of parallel rays.

The field lens 38' produces on the photocell 40' an image of the filament 30'. Between the field lens 38' and the photocell 40' is disposed a ground glass disc 39' closer to the photocell 40', which opaque disc 39' serves the purpose to distribute the light equally on the photocell 40'.

In the arrangement wherein the second measuring body 35' follows the first measuring body 32', it is to be observed that the scale 37' must be arranged in a direction opposite to that of the scale 33'.

If one of the two measuring bodies 32' and 35' is moved relative to the other measuring body which is immovable in the direction of the scale, a minimum of the light flow originating from the filament 30' hits the photocell 40', which light flow leads from the filament 30' through the optical elements of the device and through the two measuring bodies 32' and 35', when the scale lines 33' and 37' cover each other very well.

The electrical values, for instance the voltage produced by the photocell 40', which electrical values are controlled by the oncoming light stream, are fed to a measuring device 42' through an amplifier 41', which measuring device 42' indicates the value of the light stream falling onto the photocell 42'. In the arrangement shown in FIG. 9, the scale lines of both scale bodies may be provided in transparent form on a non-transparent base.

It is quite apparent that the described arrangements of the present invention may be used for the adjustment of lengths and angles generally as normal length scale and as normal circular scale, respectively. It is thus possible to build in such scales for instance as length-normal and angle-normal in measuring devices for lengths and angles, as for instance in length comparators, circular scale testing devices, etc.

While I have disclosed several embodiments of the present invention, it is to be understood that these embodiments are given by example only and not in a limiting sense, the scope of the present invention being determined by the objects and the claims.

I claim:

1. A device for the adjustment and measuring of lengths, comprising two scale bodies, each of said bodies having a scale consisting of a plurality of scale indications at substantially constant intervals from each other, each of said scale indications of one of said scale bodies co-operating with one of said scale indications of the other of said scale bodies, said scale indictions of one of said scale bodies having a periodically repeating error curve and the other of said scale bodies having a plurality of scale indications identical in number with that of each period of said one of said scale bodies, and means determining the average value of the squares of the deviations of the individual opposite pairs of corresponding scale indications from the error-free positions.

2. The device, as set forth in claim 1, wherein said means determining the average value of the squares of the deviations of the individual opposite pairs of corresponding scale indications from the error-free positions comprises capacitive means.

3. The device, as set forth in claim 1, wherein said means determining the average value of the squares of the deviations comprises photo-electric means.

4. The device, as set forth in claim 1, which includes means for relative movement between said scale bodies in the direction of said scales carried by said scale bodies and wherein said scales on said scale bodies are disposed parallel to and opposite each other.

5. A device for the adjustment and measuring of lengths in longitudinal and angular direction, respectively, comprising two scale bodies, each of said bodies having a scale consisting of a plurality of scale indications at substantially constant intervals from each other, each of said scale indications of one of said scale bodies co-operating with one of said scale indications of the other of said scale bodies, said scale indications of one of said scale bodies having a periodically repeating error curve and the other of said scale bodies having a plurality of scale indications identical in number with that of each period of said one of said scale bodies, means determining the average value of the squares of the deviations of the individual opposite pairs of corresponding scale indications from the error-free positions, and said scale of one of said scale bodies is the exact mirror picture of said scale of the other of said scale bodies.

6. The device, as set forth in claim 1, wherein the scale of one of the scale bodies has at least a length which is equal with the length of the other of said scale bodies jointly with a scale to be produced, and wherein the longer scale of said one of said scale bodies comprises a first plurality of scale indications and a second plurality of scale indications which form a mirror picture of the scale of the other of said scale bodies and have a length geometrically exactly equal with the latter, and said pluralities of scale indications are in the same direction in such a manner that the last scale indication of said first plurality of scale indications of said one of said scale bodies coincides exactly with the first scale indication of said second plurality of scale indications of said one of said scale bodies.

7. The device, as set forth in claim 1, wherein the scale of one of said scale bodies is a photo-mechanical reproduction of said scale of said other of said scale bodies.

8. The device, as set forth in claim 1, wherein said scale of one of said scale bodies is a photographic reproduction of said scale of said other of said scale bodies.

9. The device, as set forth in claim 1, wherein the scale indication of one of said scale bodies is reproduced by photographic means by means of layers applied in a high vacuum on said other of said scale bodies.

10. The device, as set forth in claim 1, wherein the scale of one of said scale bodies is obtained by photographic means from the scale of the other of said scale bodies, said latter scale constituting a mirror picture copy of said scale on said first mentioned scale body and the last scale indication of the first of said mirror picture copies coinciding with the first scale indication of the adjoining of said mirror picture copy.

11. The device, as set forth in claim 1, wherein each of said scale bodies forms an electrode of a condenser and said scale bodies forming jointly a condenser, the capacity of said condenser being responsive to the relative position of said scale bodies, and said scale bodies including means for measuring the capacity of said jointly formed condenser.

12. The device, as set forth in claim 1, wherein said scales of said two scale bodies comprise an electrically non-conducting scale body and electrically conducting scale indications mounted on said scale body, and means for connecting electrically said scale indications.

13. The device, as set forth in claim 1, wherein one of said scale bodies comprises an electrically non-conducting member and electrically conducting scale indications mounted thereon, and means for electrically connecting said scale indications, and said other of said scale bodies having scale indications of a material of a high di-electric constant, said last mentioned scale indications being mounted on an electrically conducting member.

14. The device, as set forth in claim 1, wherein said two scale bodies form jointly a shutter system, the light reducing effect of said system being responsive to the relative position of said two scale bodies.

15. The device, as set forth in claim 14, wherein said scale bodies forming said shutter system have scales on faces of said bodies disposed opposite each other and arranged closely towards each other.

16. The device, as set forth in claim 14, wherein one of said scale bodies is projected towards another of said scale bodies by optical means.

17. The device, as set forth in claim 14, wherein said scale of said one scale body has transparent portions, and said scale of the other of said scale bodies has non-transparent portions said scale of one of said scale bodies is an exact mirror picture of said scale of the other of said scale bodies as to its geometrical configuration, and said transparent portions of said scale of said one scale body correspond with said non-transparent portions of said scale of the other of said scale bodies.

18. The device, as set forth in claim 1, which includes means for moving one of said scale bodies relative to the other of said scale bodies in the direction of said scale for a length of a plurality of said scale lines.

References Cited in the file of this patent

UNITED STATES PATENTS

| | | |
|---|---|---|
| 2,406,299 | Koulicovitch | Aug. 20, 1946 |
| 2,476,410 | Gardiner | July 19, 1949 |
| 2,559,389 | Beeber et al. | July 3, 1951 |
| 2,916,826 | Bower et al. | Dec. 15, 1959 |
| 2,938,270 | Werner | May 31, 1960 |
| 2,961,917 | Werner | Nov. 29, 1960 |